United States Patent Office 2,818,418
Patented Dec. 31, 1957

2,818,418

CATALYTIC HYDROGENATION OF
CARBON MONOXIDE

Walter Rottig and Paul Schaller, Oberhausen-Sterkrade-Nord, Germany, assignors to Ruhrchemie Aktiengesellschaft and Lurgi Gesellschaft für Wärmetechnik m. b. H., a German corporation No Drawing. Application March 17, 1953
Serial No. 342,976

Claims priority, application Germany March 17, 1952

14 Claims. (Cl. 260—449.6)

This invention relates to improvements in the catalytic hydrogenation of carbon monoxide.

In the catalytic hydrogenation of carbon monoxide with the use of iron catalysts in addition to precipitated catalysts, fused and sintered catalysts have been suggested. These fused and sintered catalysts have been almost exclusively used in the so-called fluidized synthesis since the mechanical strength of precipitated catalysts is not sufficient to meet the conditions occurring in the fluidized process. Fused and sintered catalysts have also been used in both pulverulent and granular state for the so-called wet synthesis with moving or fixed-bed catalysts. When the effecting of the synthesis with fixed-bed catalysts in tubes, however, fused and sintered catalysts have only been suggested rarely. One reason for this is that the fused and sintered catalysts generally require a higher operating temperature as compared with precipitated catalysts to yield a $CO+H_2$ conversion on a commercially usable level.

The fused and sintered catalysts so far suggested include more than 90% and preferably even more than 95% of iron. Activators such as aluminium oxide, titanium oxide, zirconium oxide, as well as silicon dioxide and other compounds, have been suggested as materials of addition. Relatively low alkali content, generally limited to 1% based on iron present, has been proposed for an activating effect. These catalysts of the type of the conventional fused catalysts for the ammonia synthesis are prepared by melting iron or iron powder, or if desired, iron oxide powder separately or mixed with one another in an oxidizing atmosphere while the addition of activators is effected before or during the melting. It has also been suggested to heat the corresponding powders only to a temperature at which sintering occurs rather than to melt them, in order to obtain a more porous catalyst structure. However, up to the present, these operating methods have found no successful use on a commercial scale for the carbon monoxide hydrogenation.

One object of this invention is the catalytic hydrogenation of carbon monoxide with the use of fused or sintered iron catalysts with good yields without the difficulties previously encountered. This and still further objects will become apparent from the following description:

In accordance with the invention, the process for the hydrogenation of carbon monoxide is one effected with the use of fused or sintered iron catalysts containing at least 5% of copper and preferably 15% of copper based on iron present and, if necessary or desired, the conventional activators. The synthesis is carried out at temperatures of approximately 150–350° C. and preferably of 180–270° C. and pressures of 1–200 atmospheres and preferably 10–50 atmospheres. It has now been found that this synthesis process may be carried out in a particularly easy manner and with good yields if these fused and sintered catalysts are reduced with hydrogen and/or carbon monoxide containing gases at temperatures of below 350° C. and preferably of below 300° C. With the use of these catalysts, so reduced, the carbon monoxide hydrogenation may be carried out at reaction temperatures which are considerably lower than those used in the synthesis carried out with the use of the previously suggested fused and sintered catalysts. At the same time, the addition of copper has the effect of considerably reducing the proportion of undesirable $C_1$–$C_2$ compounds in the primary products. Furthermore, this largely eliminates the troublesome property of the fused and sintered catalysts hitherto disclosed to form carbon to a relatively large extent during the synthesis, which carbon causes considerable technical difficulties and a severe reduction of the activity of the catalyst. Due to the high copper content, it is not possible, in accordance with the invention, as contrasted to the prior art, to effect the reducing pre-treatment of the catalysts at a low temperature of below 350° C. in the synthesis reactor proper.

Of particular advantage is the fact that catalysts of this kind show no shrinkage during the reduction which could cause the formation of hollow spaces and channels in reactors which, for example, are provided with tubes.

It is highly remarkable that the process may be carried out with excellent yields of synthesis products containing increased proportions of high molecular weight, oxygenated products and particularly of esters, if more than 20% and preferably more than 25% of copper and more than 4% and preferably 6–10% of alkali calculated as $K_2O$ each based on the iron present are contained in the catalyst while the content of free iron after the reduction is at least 80% of total iron.

The compounds resulting in the synthesis include, at normal temperature: gaseous hydrocarbons, a large percentage of the liquid hydrocarbons and alcohols, and the solid high molecular weight hydrocarbons. Valuable low molecular weight alcohols are contained in the forming reaction water. Of the greatest practical interest is the composition of the main product, i. e. the liquid hydrocarbons and alcohols. The increased alkali content of the catalysts allows an extensive specialization of these synthesis products depending on the conditions of the preparation of the catalyst and the kind of the alkali added.

Fused and sintered catalysts which have been subjected to a short complete reduction at a temperature of, for example, 350° C. and also at lower temperatures, i. e. catalysts having a reduction value of more than 80% of the iron and a high copper content and a high alkali content of more than 4% $K_2O$ based on iron present effect, for example, to an increased extent the formation of oxygenated compounds boiling above 320° C. in which the ester component represents not only a very high percentage of the total product as, for example, more than 25% by weight and preferably more than 35% by weight and outweighs to a considerable degree the content of alcohols, but in which also the total content of products boiling above 320° C. reaches a level of approximately more than 25% which is very surprising for fused and sintered catalysts. In the fraction boiling between 30 and 180° C., the alcohols are the main oxygenated products. In the fraction 180–320° C., the ester content amounts to approximately 20–30% and is thus nearly always higher than that of alcohols.

If the alkali component is fused catalysts is added in the form of, for example, potassium silicate rather than, for example, as KOH or $K_2CO_3$, then the formation of high molecular weight hydrocarbons increases on the expense of the ester content.

Furthermore, an incomplete reduction of the same catalyst which contains somewhat less alkali, makes possible the production of a high content of oxygenated compounds in the synthesis products; with, however, a decrease in the portion of esters in the oxygenated products while the portion of alcohols increases considerably. When this is the object, i. e. when conducting the synthesis towards the recovery of synthesis products which contain more than 50% of oxygenated compounds with no particularly high portion of esters, then fused and sintered catalysts must be used, the copper content of which is in excess of 5% and preferably in excess of 20%, the alkali content of which is in excess of 1.5% and preferably in excess of 4% and the content of free iron of which is below 80% and preferably 20–60% of the total iron.

In contrast to the synthesis with precipitated catalysts, in which catalysts with reduction values of above 60% and preferably above 80% of the iron present, are, in general, fundamental for favorable results in the recovery of more than 50% of oxygenated compounds, it is very surprisingly possible, when operating with fused and sintered catalysts to obtain a marked increase in the formation of oxygenated products to 60% and more with the use of the iron-copper-alkali catalysts according to the invention having reduction values of only 20–60%.

An additional advantage of the process, according to the invention, consists in that, with the use of the catalysts in accordance with the invention, the methane formation which is generally undesired in the carbon monoxide hydrogenation, is very low and constitutes only a fraction of the methane formation hitherto observed. Moreover, the content of products having a boiling point in excess of 320° C. is, in general, higher than with the hitherto known fused and sintered catalysts. Yields of more than 30% are obtainable without any difficulty.

The process, in accordance with the invention, is most suitably carried out with fixed-bed catalysts which, however, under certain circumstances may be surrounded by a liquid cooling agent. The process is also applicable to a synthesis with a pulverulent catalyst ("fluidized synthesis"). In the first case, grain sizes of between approximately 0.5–6 mm. and preferably between 1–4 mm. are used. The fluidized synthesis uses grain sizes of below 0.5 mm. and preferably below 0.2 mm. Finally, the process of the so-called "wet synthesis" may be carried out with any grain size.

The reduction of the catalysts according to the invention which may be carried out, if desired, in the synthesis reactor itself, is most suitably effected with the use of a high gas velocity of above 50 cm./second and preferably above 120 cm./second measured under standard conditions. The reduction may be effected at atmospheric pressure, superatmospheric pressure or partial vacuum with gas velocities of 50–150 cm./second based on standard conditions when operating at atmospheric pressure and of 5–40 cm./second when operating at superatmospheric pressure while the $H_2O$ content of the reduction gas is maintained below 1 gram/cu. m. and preferably below 0.1 gram/cu. m. When the reduction is effected at superatmospheric pressure, pressures up to 200 atmospheres are applicable.

When operating with catalysts which yield less than 80% and preferably 20–60% of free iron, it has been found to be particularly advantageous to effect the reduction with hydrogen and/or carbon monoxide-containing gases for 30–90 minutes in the temperature range between 300 and 350° C., for about 90–240 minutes in the temperature range between 250 and 300° C.; and for more than 240 minutes to as long as 600 minutes at temperatures of below 250° C. With all fused or sintered iron-copper-alkali catalysts, according to the invention, synthesis gases rich in carbon monoxide should be used for the purpose of obtaining an increased yield of high molecular weight oxygenated compounds, especially of esters. The same catalysts are suitably operated with hydrogen-rich gases if lower molecular weight products having a reduced content of ethers, but an increased content of alcohols especially such of a C number of between 5 and 18, are to be recovered.

The activators for the catalysts mentioned above include, for example, chromium oxide, manganese oxide, aluminium oxide, calcium oxide, titanium dioxide, silicon dioxide, alkalis or alkaline earths.

The production of the fused catalysts used is simplified if a part of the mixture of the fusing component consists of salts which exhibit oxidizing properties. Nitrites, nitrates or perborates have been found to be particularly suitable for this purpose.

The execution of the reduction in the synthesis reactors proper eliminates the necessity of a specific reduction apparatus as was required heretofore in most cases.

The production of the catalysts used, in accordance with the invention, follows partially the conventional expedients, but is fundamentally different therefrom in several details. The iron present in the catalyst may be used in the metallic state, but preferably in the form of oxide. The copper may likewise be used in the form of oxide, i. e. in the form of the monovalent, as well as the bivalent oxide. However, in certain cases, the use of metallic copper is particularly favorable. For the purpose of the oxidation, it is frequently of advantage to use a certain part of the metals in the form of salts such as in the form of nitrates or perborates. This applies in particular if the portion present as metal is high.

For the production of fused catalysts, the starting material may be in the form of powder, as well as in the form of lumps. For the production of sintered catalysts, it has been found to be particularly advantageous to add the iron and copper used as the starting material in the form of a powder of the smallest possible grain size of below 100µ and preferably below 10µ.

In the production of sintered catalysts, the sintering temperature and sintering period are of considerable importance. When starting with metals, lower temperatures are required than with metal oxides. The sintering time is determined by the grain structure desired. The grain size increases and the pore volume decreases as the sintering time increases. The atmosphere used for the fusion and sintering should be oxidizing in order to largely convert the metallic components into the oxide and to prevent a premature reduction of the metal oxides. The addition of activators which are the conventional elements and their compounds known for the carbon monoxide hydrogenation from the literature may be effected before the fusion or during the same. With sintered catalysts, it is generally favorable to add the activators before the sintering. In a few cases, it is also possible, for example, to soak the sintered material, after the sintering, with aqueous solutions of the activators and to subject the material to an after-sintering. In this way, the addition of alkali such as in the form of potassium carbonate and potassium silicate, sodium nitrate, etc. is possible.

The cooling of the molten mass is most suitably effected in the air. This is followed by crushing the fused or sintered mass. In the case of a synthesis carried out in tubes, the catalyst grains used for the carbon monoxide hydrogenation should have a diameter of between approximately 0.5–5 mm. and preferably between 1–3 mm. In a liquid phase synthesis, the grain size may advantageously range considerably lower, such as, for example, below 100µ. The pulverulent portions obtained may be added to a new melt.

Due to their low tendency to form carbon deposits, the catalysts in accordance with the invention may also be used for the fluidized synthesis. It is also possible to use them for such processes of the carbon monoxide hydrogenation which operate at a gas velocity which ranges considerably above that of the fluidized system. The use of the catalysts according to the invention for a carbon monoxide hydrogenation in the liquid phase and, above all, in the oily phase is possible in both the pulverulent and granular state.

The regeneration of the spent fused catalysts may be effected in accordance with the status of the art by an oxidizing remelting preceded, if necessary or desired, by a treatment with hydrogen. In special cases, it is sufficient to subject the catalysts to a careful oxidizing treatment with gases which contain only little oxygen such as 0.5–5% in order to burn off the carbon deposited on the catalyst. Thereafter, a reactivation with reducing gases is required. This latter expedient may also be applied under certain circumstances to sintered catalysts. When completely working up the catalyst mass, it may be sufficient in particular cases to crush the mass to the grain size stated above and then to subject it to a new sintering. Since such catalysts have a structure somewhat different from that of the initial catalyst, they frequently give somewhat different synthesis results. A chemical processing with the separation into the individual starting compounds thus cannot be avoided in particular cases.

Pressures of as low as 1 atmosphere absolute may be used in the carbon monoxide hydrogenation. The synthesis results become favorable, however, when operating above 5 atmospheres such as, for example, 10–40 atmospheres. The gas load may be varied within wide limits such as, for example, between 10 and 1000 volumes of gas per volume of catalyst per hour. The temperature ranges between approximately 150–350° C. when working with fixed-bed catalysts and preferably between 170 and 270° C., while the $CO:H_2$ ratio may range between approximately 1:0.5 and 1:5. The use of gas recycling which may range, for example, between 1:1 and 1:4 is favorable in any case. It is also possible, however, to operate on a once through basis. When operating the fluidized synthesis and, under certain circumstances, the so-called wet synthesis, the synthesis temperatures used may be still higher.

When operating with fixed-bed catalysts, it is possible to use long and wide tubes in the synthesis such as, for example, tubes of 10–25 m. length while the diameter of the tubes may be approximately 10–100 mm. and preferably 30–50 mm. Of course, short and narrow tubes may also be used. All percentages in the following examples except for the gas-analytical data are percentages by weight.

Example 1

1000 grams of a mixture consisting of $Fe_2O_3$ (polishing red), CuO and potassium carbonate with the ratio of $Fe:Cu:K_2O$ being 100:25:8 were fused with the addition of oxygen. The fusing temperature of the mixture was approximately 1600° C. The grain size of $Fe_2O_3$ and CuO was approximately 1–3$\mu$ and 18$\mu$, respectively.

After cooling of the melt, the fused cake was crushed to a grain size of between 1.0 and 2 mm. The reduction was effected for 2 hours at 350° C. with $H_2N_2$ (75% $H_2$, 25% $N_2$) using a gas velocity of 1.5 m./second (standard conditions). Thereafter, the reduction value was approximately 100%.

When this catalyst was charged to a so-called double tube reactor which had an annular space of 24 x 44 cm. and was operated with super-purified water gas at a synthesis pressure of 20 atmospheres in single-pass operation, a CO conversion of 81% ($CO+H_2$ conversion=61.5%) was obtained at a temperature of 207° C. The composition of the liquid primary products was as follows:

| Fraction | Wt.—percent of total liquid product | Aliphatic esters, percent | Alcohols, percent |
| --- | --- | --- | --- |
| Above 320° C | 26.2 | 40 | 2 |
| 180–320° C | 25.8 | 25 | 10 |
| 30–180° C | 48.0 | 10 | 33 |

When using a standard ammonia synthesis catalyst consisting of approximately 96% Fe and small amounts of $Al_2O_3$, $SiO_2$, etc., a synthesis temperature higher by 12° C. was required under the same synthesis conditions to obtain the same conversion. The yield of compounds boiling above 320° C. was below 19%, the ester content was approximately 20%.

Example 2

A catalyst which contained 5.2% $K_2O$ instead of 8% $K_2O$ and, in addition, 10 parts of ZnO (grain size about 1$\mu$) based on iron was prepared in accordance with Example 1. Under the same reduction and synthesis conditions as described in Example 1, the following results were obtained:

CO conversion _____percent__ 81.5
$CO+H_2$ conversion _____do____ 63
Synthesis temperature, ° C_____ 207

The composition of the synthesis product obtained was as follows:

| Fraction | Wt.—percent of total liquid product | Esters, percent | Alcohols, percent |
| --- | --- | --- | --- |
| Above 320° C | 28 | 25 | 10 |
| 180–320° C | 26 | 22 | 22 |
| 30–180° C | 46 | 13 | 30 |

When this catalyst was reduced in a synthesis reactor of 5 m. length (tube diameter 14 mm.) for 30 hours at 250° C. with a mixture consisting of 75% $H_2$ and 25% $N_2$ (reduction value 85%) and subsequently operated under the conditions given above, the following results were obtained:

CO conversion _____percent__ 84
$CO+H_2$ conversion _____do____ 63
Synthesis temperature, ° C_____ 231

(With a reduction time of 48 hours, the synthesis temperature could be lowered to 225° C.) The composition of the liquid products obtained was similar to that given above.

Example 3

A mixture consisting of $Fe_2O_3$, CuO (grain size of $Fe_2O_3$ about 3$\mu$, of CuO about 2$\mu$ and $K_2CO_3$ in a ratio of 100:25:5 calculated as $Fe:Cu:K_2O$ was pasted with little water, dried for 5 hours at 100–120° C. and sintered for 60 minutes at a temperature of 1150° C. with the addition of air. The cooled mass was crushed and sieved to a grain size of between 1 and 2 mm.

The reduction of the granular catalyst was effected for 120 minutes at a temperature of 350° C. with a mixture consisting of 75% $H_2$ and 25% $N_2$ at atmospheric pressure using a linear gas velocity of 1.5 m./second. The reduction value of the reduced catalyst was about 80%.

When this catalyst was operated at a synthesis pressure of 20 atmospheres with water gas on a once-through basis, a $CO+H_2$ conversion of 61% was obtained at 215° C. The gas load was 200 liters of gas per liter of catalyst per hour. The liquid product obtained had the following composition:

| Fraction | Wt.—percent of total liquid product | Esters, percent | Alcohols, percent |
| --- | --- | --- | --- |
| Above 320° C | 29 | 45 | 1 |
| 180–320° C | 20 | 33 | 5 |
| 30–180° C | 51 | 11 | 35 |

When the same catalyst was reduced in a synthesis reactor for 30 hours at 250° C. with $H_2/N_2$ (reduction value 82%), the $CO+H_2$ conversion under the same conditions as set forth above was 63% at a synthesis temperature of 230° C. The yield of high boiling products and of oxygenated compounds in the liquid product was somewhat reduced.

Example 4

A hot aqueous solution containing per liter 40 grams Fe and 10 grams Cu in the form of their nitrates was poured into a likewise hot solution of 100 grams of soda/liter of water. The quantities were so proportioned that the pH value after the precipitation was approximately 7–7.2. The precipitated catalyst mass was filtered in the hot state, freed by washing from the alkali to about 0.5 grams residual alkali based on 100 grams of iron, and divided into two parts. The first part was impregnated with KOH in such a manner that 6 $K_2O$ calculated parts were contained therein per 100 parts of iron. The second portion was impregnated with potassium water glass in such a manner that 5 $K_2O$ calculated parts and 25 parts $SiO_2$ were present for every 100 parts of Fe. The moist mass was dried at about 120° C.

The two masses were separately fused at about 1500° C. with the addition of air as oxidizing agent. The melt obtained was crushed and sieved to a grain size of between 1 mm. and 2.5 mm. (The undersized grains and the dust may be added to a new melt.)

The reduction was carried out for 120 minutes at 350° C. with a mixture consisting of 75% $H_2$ and 25% $N_2$. The reduction values were 85% of iron based on total iron.

When the catalyst which had been impregnated with KOH was reacted with water gas as the synthesis gas at 210° C., a pressure of 20 atmospheres and a gas load of 200 volumes of gas per volume of catalyst per hour, a $CO+H_2$ conversion of 63% was obtained. The liquid product obtained had the following composition:

| Fraction | Wt.—percent of total liquid product | Esters, percent | Alcohols, percent |
| --- | --- | --- | --- |
| Above 320° C | 27 | 41 | small amount. |
| 180–320° C | } 72 | { 29 | 10. |
| 30–180° C | | 8 | 30. |

In addition, all fractions contained small amounts of ketones, aldehydes and acids.

With the use of gas recycling (1:2), the other conditions being the same, the yield of high molecular weight compounds increased somewhat (to 31%; moreover, the yield of oxygenated compounds increased to a certain extent.

When reducing the catalyst at 240° C. with a gas consisting of 27% CO, 52% $H_2$, the remainder being inerts, at a linear gas velocity of 1.3 m./second based on standard conditions, 24 hours were required. The reduction value was thereafter 80%. The yield of high molecular weight compounds boiling above 320° C. increased by 3% while the yield of oxygenated compounds decreased somewhat in favor of the olefins.

The second catalyst which was reduced under the same conditions set forth above resulted in all of the three experiments in an increased yield of products boiling above 320° C. The proportion of the other fractions, above all that of the fraction 30–180° C., decreased correspondingly. The yield of oxygenated compounds was likewise reduced in all fractions.

Example 5

A mixture of 100 parts of iron in the form of $Fe_2O_3$ having a grain size of 1–3μ, 25 parts of copper in the form of CuO having a grain size of about 8μ, and potassium carbonate in a quantity of 5% by weight calculated as $K_2O$ and referred to total iron was rapidly melted down with the addition of ample oxygen. After cooling and crushing to a grain size of 1.5–2 mm., the mass was reduced in a reduction apparatus for 10 hours at a temperature of 240° C. with a gas mixture consisting of 75% $H_2$ and 25% $N_2$ at a linear gas velocity of 1.5 m./second based on standard conditions. The reduction value was thereafter 23%. When reducing at a temperature of 290° C. for 3 hours, the reduction value was 44% while 350° C. and 90 minutes gave a reduction value of 60%.

These three catalysts were tested in reactors of 1.5 m. length and a tube diameter of 12 mm. The synthesis gas was super purified water gas; the synthesis pressure was 20 atmospheres and the gas load was 200 volumes of gas per volume of catalyst per hour. The synthesis was carried out on a once-through basis. The CO conversion was 81–84% with a consumption ratio of 0.7–0.75, and the methane formation was between 6 and 8%. A comparative experiment carried out at a temperature which was only by 20° C. higher with a standard ammonia synthesis catalyst which was reduced to about 20% Fe gave in all fractions substantially lower yields (only about half as high) of oxygenated compounds, considerably lower yields of high molecular weight compounds (only about 15% and a substantially higher methane formation (about 15%).

Example 6

A mixture consisting of $Fe_2O_3$ having a grain size of 1–3 μ, CuO having a grain size of about 8 μ, and potassium carbonate in a ratio of 100:22:5 calculated as Fe:Cu:$K_2O$ was pasted with little water, granulated to a grain size of 1.5–2 mm., dried at 130° C. for several hours and sintered at 1250° C. for 60 minutes.

The reduction was effected at 240° C. for 9 hours (reduction value 25), at 280° C. for 3 hours (reduction value 39) and at 340° C. for 75 minutes (reduction value 57).

The comparative tests were carried out in a reactor of 12 mm. inside diameter and 1.5 m. length which was heated with pressure water. Super-purified water gas was used as synthesis gas; the synthesis pressure was 20 atmospheres and the gas load was 200 volumes of gas per volume of catalyst per hour. The synthesis was effected without gas recycling. The following results were obtained:

| Reduction value of the catalyst | Synthesis temperature, ° C. | Content of oxygenated compounds, chiefly alcohols, in the liquid product, percent | High molecular weight compounds, percent | Methane formation based on $CO+H_2$ charged, percent |
| --- | --- | --- | --- | --- |
| 25 | 218 | 61 | 35 | 5 |
| 39 | 215 | 57 | 32 | 6.5 |
| 57 | 212 | 52 | 28 | 8 |

The CO conversion was about 85% with the consumption ratio being 0.7.

With one-stage operation, conversion rates of 90% and more such as, for example, 95% may be obtained without any difficulty. In multi-stage operation, a partial removal of the carbon dioxide between the stages is favorable under certain circumstances.

In the preparation of the catalyst, as set forth, for example, in Example 4, the fusing of the catalyst may be effected with at least a portion of the fusing components in the form of salts having oxidizing properties, said salts being, for example, nitrates, nitrites, perborates, etc.

We claim:

1. In the process for the catalytic hydrogenation of carbon monoxide with the contacting of a carbon monoxide hydrogen containing gas with a catalyst at a temperature between about 150 and 350° C. under a pressure of about 1 to 100 atmospheres absolute and the recovery of the synthesis product produced, the improvement which comprises effecting said contacting with an iron catalyst selected from the group consisting of fused and sintered iron catalysts containing more than 20% by weight of copper based on the iron present and reduced prior to the contacting at an elevated reduction temperature not in excess of about 350° C. at normal pressure and a reduction of gas velocity between about 50 and 150 centimeters per second with a reducing gas having a water content of less than about 1 gram per cubic meter and containing a member selected from the group consisting of hydrogen, carbon monoxide and mixtures thereof.

2. Improvement according to claim 1 in which said contacting is effected at a temperature of about 180–270° C. and a pressure of about 10–50 atms. absolute.

3. Improvement according to claim 1 in which said catalyst contains more than 4% alkali calculated as $K_2O$ based on the iron present, and in which the catalyst is reduced to a free iron content of at least 80% based on the total iron.

4. Improvement according to claim 3 in which said catalyst contains more than 25% copper based on the iron present and 6–10% alkali calculated as $K_2O$ and based on the iron present.

5. Improvement according to claim 1 in which said catalyst contains at least 1.5% alkali calculated as $K_2O$ and based on the iron present and is reduced to a free iron content of less than 80%.

6. Improvement according to claim 5 in which said catalyst contains an alkali content of at least 4% calculated as $K_2O$ and based on the iron present and in which the catalyst is reduced to a free iron content of 20–60% based on the total iron.

7. Improvement according to claim 1 in which said catalyst is reduced prior to said contacting for about 30–90 minutes at a temperature of about 300–350° C.

8. Improvement according to claim 1 in which said catalyst is reduced prior to said contacting for about 90–240 minutes at a temperature of about 250–300° C.

9. Improvement according to claim 1 in which said catalyst is reduced prior to said contacting for about 240–600 minutes at a temperature below 250° C.

10. Improvement according to claim 1, in which said catalyst is sintered from a powder having a grain size below about 100 $\mu$.

11. Improvement according to claim 1, in which said contacting is effected with said catalyst in a fixed bed.

12. In the method for the production of fused and sintered iron catalysts for the catalytic hydrogenation of carbon monoxide containing more than 20% by weight of copper based on the iron present, the improvement which comprises reducing the catalyst with a reduction gas having a water content of less than one gram per cubic meter containing a member selected from the group consisting of hydrogen, carbon monoxide and mixtures thereof at a temperature not in excess of 350° C., normal pressure and a gas velocity between about 50 and 150 centimeters per second.

13. Improvement according to claim 12 in which the catalyst is sintered from a powder having a grain size below 100 $\mu$.

14. Improvement according to claim 13 in which said powder has a grain size below 10 $\mu$.

References Cited in the file of this patent

UNITED STATES PATENTS

| | | |
|---|---|---|
| 1,865,770 | Larson | July 5, 1932 |
| 2,234,246 | Groombridge et al. | Mar. 11, 1941 |
| 2,541,671 | Segura et al. | Feb. 13, 1951 |
| 2,552,422 | Gillespie | May 8, 1951 |
| 2,602,810 | Montgomery et al. | July 8, 1952 |
| 2,647,138 | Rottig | July 28, 1953 |
| 2,660,599 | Rottig | Nov. 24, 1953 |
| 2,683,726 | McGrath et al. | July 13, 1954 |
| 2,702,814 | Riblett et al. | Feb. 22, 1955 |

FOREIGN PATENTS

| | | |
|---|---|---|
| 529,390 | Great Britain | Nov. 20, 1940 |

OTHER REFERENCES

Storch et al., "The Fischer-Tropsch and Related Synthesis," pages 37, 240, 241, 242, 243, 272, 279, 280, 282, 318, and 319, (1951), John Wiley & Sons, Inc., New York, N. Y.

UNITED STATES PATENT OFFICE
CERTIFICATE OF CORRECTION

Patent No. 2,818,418                                                      December 31, 1957

Walter Rottig et al.

It is hereby certified that error appears in the printed specification of the above numbered patent requiring correction and that the said Letters Patent should read as corrected below.

Column 2, line 41, for "dependnig" read -- depending --; line 64, for "is", first occurrence, read -- in --; column 7, line 40, in the table, second column, for "27" read -- 28 --.

Signed and sealed this 25th day of February 1958.

(SEAL)
Attest:
KARL H. AXLINE
Attesting Officer

ROBERT C. WATSON
                                                             Commissioner of Patents